(12) United States Patent
Bisig

(10) Patent No.: US 8,483,017 B2
(45) Date of Patent: Jul. 9, 2013

(54) ELECTROSTATIC MOTOR INCLUDING AN ACTUATOR

(75) Inventor: Martin Bisig, Zuchwil (CH)

(73) Assignee: ETA SA Manufacture Horlogére Suisse, Grenchen (CH)

( * ) Notice: Subject to any disclaimer, the term of this patent is extended or adjusted under 35 U.S.C. 154(b) by 868 days.

(21) Appl. No.: 12/560,889

(22) Filed: Sep. 16, 2009

(65) Prior Publication Data

US 2010/0085843 A1   Apr. 8, 2010

(30) Foreign Application Priority Data

Sep. 16, 2008   (EP) .................................... 08164414

(51) Int. Cl.
*G04F 5/00*   (2006.01)
(52) U.S. Cl.
USPC .......................................... 368/160; 368/157
(58) Field of Classification Search
USPC ................................................ 368/157, 160
See application file for complete search history.

(56) References Cited

U.S. PATENT DOCUMENTS

| | | | |
|---|---|---|---|
| 7,161,518 B1 | 1/2007 | Webb et al. | |
| 7,333,400 B2 * | 2/2008 | Blondeau et al. | 368/157 |
| 7,592,737 B2 | 9/2009 | Bourbon et al. | |
| 2007/0069604 A1 * | 3/2007 | Bourbon et al. | 310/309 |
| 2007/0181411 A1 | 8/2007 | Ikehashi et al. | |
| 2008/0012449 A1 | 1/2008 | Lee | |
| 2008/0197749 A1 | 8/2008 | Paratte et al. | |

FOREIGN PATENT DOCUMENTS

| | | |
|---|---|---|
| EP | 1793208 A1 | 6/2007 |
| WO | 2004/081695 A2 | 9/2004 |

OTHER PUBLICATIONS

European Search Report issued in corresponding application No. 08 16 4414, completed May 29, 2009.
Australian Search Report issued in the corresponding Singapore application SG200906067-4, completed Mar. 30, 2010 and mailed Jun. 21, 2010.

* cited by examiner

*Primary Examiner* — Renee Luebke
*Assistant Examiner* — Jason Collins
(74) *Attorney, Agent, or Firm* — Griffin & Szipl, P.C.

(57) ABSTRACT

The electrostatic motor includes an electrostatic actuator (10) and a pulse generator (7, 8) for actuating said actuator with sufficient energy to drive the motor, the pulse generator is adapted to determine a pulse voltage level ($U_D$) and a shortened pulse duration that is a function of the determined voltage level ($U_D$) and the electric energy necessary for driving the motor and a function of parasitic capacitances ($C_P$) and the maximum capacitance ($C_{act\_m}$) of the actuator in order to reduce electrostatic losses in the actuator.

22 Claims, 3 Drawing Sheets

| $U_1$ = 25volts | $\dfrac{C_{act-m}}{C_p}$ = 1 |
|---|---|
| $U_2$ = 32volts | |

ELECTROSTATIC MOTOR INCLUDING AN ACTUATOR

This application claims priority from European Patent Application No. 08164414.8, filed Sep. 16, 2008, the entire disclosure of which is incorporated herein by reference.

FIELD OF THE INVENTION

The present invention generally concerns an electrostatic motor for incorporation, in particular, in a timepiece to drive the movement thereof. The invention concerns, more specifically, an electrostatic motor including an electrostatic actuator, for example of the type with interdigited combs.

BACKGROUND OF THE INVENTION

There is known in the prior art, in particular from WO Patent No. 2004/081695, and corresponding U.S. equivalent publication U.S. Patent Application Publication No. US 2007/0069604 A1, both of which are incorporated herein by reference, a micro-motor made in a silicon wafer. In that document, the motor is made by etching a silicon layer. It includes a toothed drive wheel and actuating fingers, which cooperate with the teeth of the wheel to cause it to rotate. Each actuating finger is secured in movement to a mobile comb, which moves relative to a fixed comb as a function of a voltage V.

Interdigited comb actuators of this type are often employed for low power mechanical actuation, such as optical switches, and they are not normally operated to achieve maximum efficiency, but are rather optimised for a minimum actuation time. In such case, the actuator is powered with a lot of energy, the excess energy being eliminated at the end of the actuation phase. This is far from being optimal in terms of energy saving.

When this type of actuator is integrated in a timepiece, which is generally powered by a battery of relatively limited capacity, the power consumption of the timepiece movement motor is critical and must therefore be reduced as far as possible.

EP Patent No. 1,793,208 discloses a servo-mechanism that includes an electrostatic actuator comprising a first fixed electrode structure and a second electrode structure, which is mobile between a first and second position, the electrode structures having a variable electrostatic capacitance depending upon the position of the mobile electrode structure. The servo-mechanism also includes a low voltage supply source, a battery for example, and a voltage booster circuit, powered by the battery. The voltage booster circuit is connected to produce a voltage between the two electrode structures, so as to generate an electrostatic force between the fixed electrode structure and the mobile electrode structure.

This prior art document teaches that it is possible to optimise the power consumption of the servo-mechanism by applying pulses with the "right voltage" and for the "right duration" between the electrode structures. In order to do this, the servo-mechanism also has regulating means, which are for supplying control pulses of variable duration to the voltage booster circuit. The regulating means supply a longer control pulse if the displacement amplitude of the mobile structure is less than a threshold value, and supply a shorter control pulse if the displacement amplitude of the mobile structure is higher than the threshold value.

According to this document, the voltage booster circuit is a step-up charger type inductive circuit. There is not therefore a voltage generator for generating a determined potential difference. In this type of circuit, the duration of the control pulses influences both the duration of the pulses supplied by the voltage booster circuit and the behaviour of the voltage. In particular, it is not possible to vary the output voltage independently of the duration of the output pulses.

SUMMARY OF THE INVENTION

It is an object of the present invention to answer the aforementioned drawbacks by providing an electrostatic motor that includes an electrostatic actuator and in which the motor is driven with reduced power consumption.

The present invention therefore concerns an electrostatic motor including an actuator that has a fixed electrode structure and a mobile electrode structure, with the mobile electrode structure being intended to move cyclically from a first position, called the rest position, to a second position, called the complete displacement position, under the effect of an electrostatic force exerted between the electrode structures, and then returned to the rest position in the absence of the electrostatic force, the motor further including shunt means connected between the fixed electrode structure and the mobile electrode structure for cyclically discharging the electrode structures so as to remove the electrostatic force once the mobile electrode structure has reached the complete displacement position, and further including a generator connected between the fixed electrode structure and the mobile electrode structure for cyclically charging the electrode structures by starting to charge when the mobile electrode is in the rest position, the electrode structures having an electrostatic capacitance that varies as a strictly increasing function of the path travelled by the mobile electrode structure from the rest position in the direction of the complete displacement position. The motor is characterized in that the generator is a voltage generator provided for generating a determined voltage, in that the generator stops charging the electrode structures as soon as the generator has supplied the actuator with the electrostatic energy necessary to complete a cycle while driving the motor at a sufficient speed, i.e. stops charging before the mobile electrode structure has reached the complete displacement position.

This electrostatic motor is more efficient than the prior solutions since the duration of the pulse generated is adjusted as a function of the electric power necessary to drive the motor, taking account of the voltage supplied by the generator.

According to an advantageous variant, the voltage generator includes means for selecting a pulse voltage level from among at least two levels and preferably four determined voltage levels, and means for regulating the pulse duration within a determined time range associated with the voltage level selected. By selecting a voltage level, this voltage generator can adapt to external conditions, such as for example the conditions of wear of a watch, in which the electrostatic motor is implemented.

According to an advantageous embodiment, the electrostatic motor also includes means for measuring the displacement of the mobile electrode structure and regulating means for making the generator stop charging the electrode structures when the position of the mobile electrode structure is close to an optimum position in which the increase in the electrode structures' capacitance relative to the rest position is equal to $C_{ref} = \sqrt{(C_p + C_{acr\_m}) \cdot C_p} - C_p$.

This solution has the great advantage of being a compromise between a very short pulse duration with a high voltage, and a very long pulse duration with a low voltage. Indeed, on the one hand, as the parasitic capacitances are charged with the energy supplied by the voltage generator, the lower the voltage, the less energy is lost. On the other hand, the longer the pulse duration, the greater the charge of the actuator's electrode structures. It is thus also important to maintain as short a pulse duration as possible to reduce electrostatic losses to a minimum in the actuator's electrodes. The solution thereof lies in a compromise consisting in having the lowest possible voltage for an optimised pulse duration, applied for a given ratio between the parasitic capacitance and the active capacitance.

According to an advantageous embodiment, the actuator electrode structures are charged by a charge pump connected to supply terminals of the actuator, the charge pump being disconnected when the optimum instantaneous capacitance is reached. This solution ensures that the energy lost outside the motor actuation phases is minimal.

According to an advantageous embodiment, the electrostatic actuator is an actuator with interdigited combs.

BRIEF DESCRIPTION OF THE DRAWINGS

Other features and advantages of the present invention will appear more clearly upon reading the following detailed description of embodiments of the invention given by way of non-limiting example and illustrated by the annexed drawings, in which.

DETAILED DESCRIPTION OF THE INVENTION

The invention will be described below solely by way of non-limiting example with reference to FIGS. 1 to 4.

Figure 1:
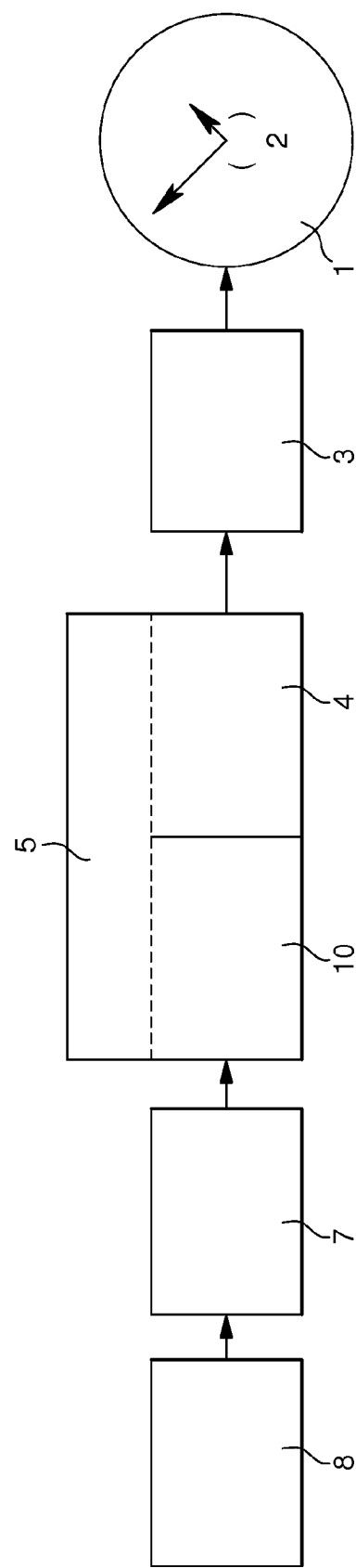
FIG. 1 shows a block diagram of a timepiece that comprises an electrostatic motor according to one embodiment of the present invention.

In FIG. 1, a timepiece is shown in the form of a block diagram, showing in particular the elements related to the present invention. This timepiece includes a dial 1 fitted with hands 2 indicating time information. The hands are driven by a set of gears 3 meshing with a mechanical interface 4 of an electrostatic motor 5. The motor is actuated via an electrostatic actuator 10. The actuator is powered by electric pulses which, in this example, are obtained by means of a charge pump 8 controlled by electronic means 7. Advantageously, elements 4, 5, 7, 8 and 10 shown in FIG. 1 are integrated.

Figure 2:
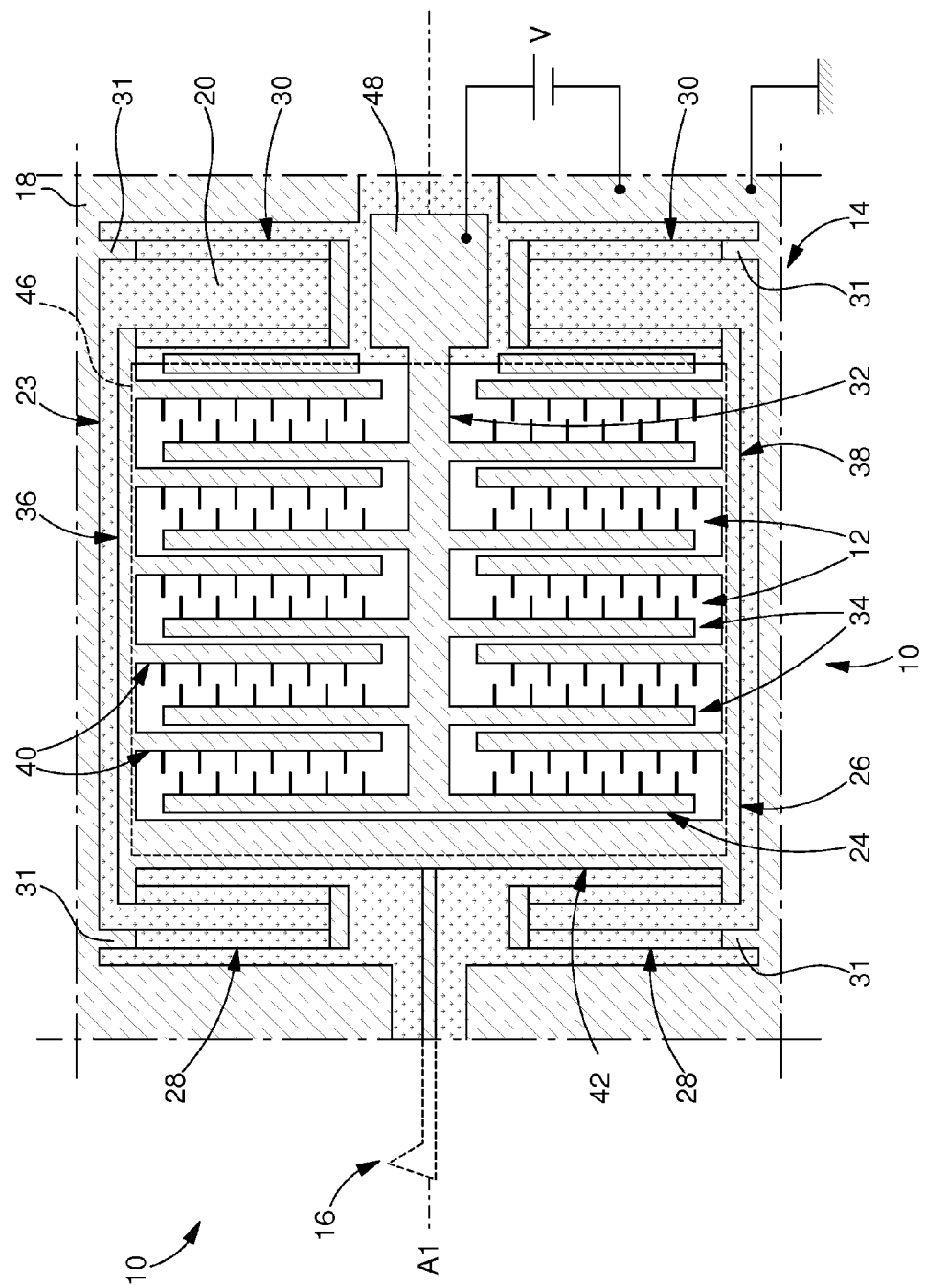
FIG. 2 is a simplified top view of an interdigited comb actuator, which forms one of the constituent parts of an electrostatic motor according to a particular embodiment of the present invention.
Figure 3:
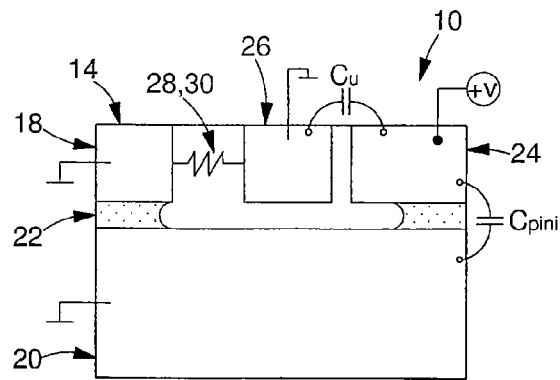
FIG. 3 is a schematic cross-section of the interdigited comb actuator of FIG. 2.

FIGS. 2 and 3 show, by way of example, a particular embodiment of an electrostatic actuator 10 with interdigited combs 12 capable of driving electrostatic motor 5 of FIG. 1. Actuator 10 is etched in a plate of crystalline or amorphous material, such as a silicon wafer. This actuator 10 is preferably for driving a toothed rotor (not shown) in rotation, by means of a click 16, which is mobile along a longitudinal direction A1, in order to form a MEMS (Micro Electromechanical System) type micromotor.

In this example, wafer 14 is of the silicon on insulator (SOI) type and includes a thick silicon substrate 20, an intermediate layer of insulating silicon oxide 22 and a top silicon layer 18 of smaller thickness than substrate 20.

Actuator 10 occupies here a generally rectangular surface on wafer 14. It extends in a generally rectangular housing 23, which is hollowed in top layer 18 and in intermediate layer 22. It includes, in top layer 18, a first frame, called the fixed electrode structure 24, and a second frame, called the mobile electrode structure 26, which moves along a longitudinal direction A1 parallel to the plane of substrate 20. The mobile electrode structure 26 is returned to a rest position by two elastic return elements 28 at the front and by two elastic return elements 30 at the back, formed by flexible beams that connect the mobile electrode structure 26 to fixed anchorages 31 on substrate 20. These fixed anchorages 31 are made in top layer 18 and are electrically connected to the portion of top layer 18 arranged around housing 23.

The displacement of mobile electrode structure 26 is caused by a voltage applied between fixed electrode structure 24 and mobile electrode structure 26. According to the example shown, fixed electrode structure 24 is placed at a potential V, whereas mobile electrode structure 26 is connected to the rest of wafer 14, which is placed at ground.

It can also be seen that fixed electrode structure 24 has a central beam 32 that extends longitudinally at the centre of actuator 10, and transverse branches 34, which extend laterally on either side of central beam 32. Transverse branches 34 may also be designated "transverse combs" by those skilled in the art. Mobile electrode structure 26 has two longitudinal, lateral beams 36, 38, arranged on either side of central beam 32, and transverse branches 40 that extend towards central beam 32, between transverse branches 34 of fixed electrode structure 24. The two lateral beams 36, 38 are connected at the front, i.e. to the left in FIG. 2, by a crosspiece 42, which carries click 16 at the front.

Interdigited combs 12 are respectively arranged on transverse branches 34, 40.

In order to produce a determined voltage $U_D$ between the fixed electrode structure and the mobile electrode structure, charge pump 8 (FIG. 1) has to supply a charge equal to $C_{comb} \cdot U_D$ (where $C_{Comb}$ is the actuator capacitance) to actuator 10. The electrostatic energy contained in the charged actuator is then equal to: $E_{Electrostatique} = 1/2 C_{Comb} \cdot U_D^2$.

The voltage U between the two electrode structures is associated with an electrostatic force, which has the effect of moving the mobile electrode structure from the rest position in the direction of the complete displacement position. Moreover, it has been seen that the capacitance of the electrode structures behaves as a strictly increasing function of the path travelled by the mobile electrode. The capacitance is thus minimum in the rest position and maximum in the complete displacement position. The minimum capacitance is called the parasitic capacitance ($C_P$). The increase in capacitance when the mobile electrode structure moves from the rest position to the complete displacement position is called the maximum active capacitance ($C_{act\_m}$). It will thus be clear that the total capacitance of the actuator in the complete displacement position is equal to $C_P + C_{act\_m}$.

Figure 4:
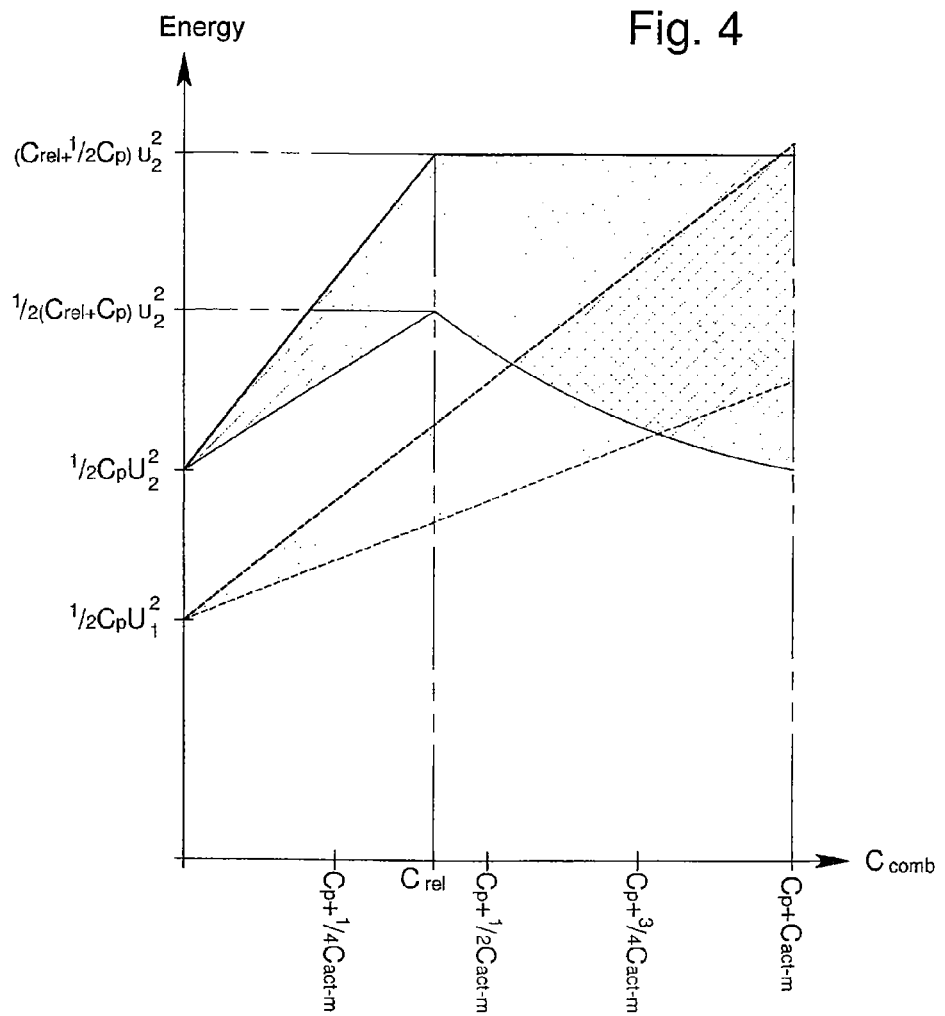
FIG. 4 is a graph showing the electrostatic energy contained in the electrode structures of the actuator of FIGS. 2 and 3 as a function of the position of the mobile electrode structure.

FIG. 4 is a graph of the total energy supplied by the voltage generator to the actuator during one cycle. The curve in a thick dotted line is the energy supplied in accordance with a control method of the prior art. According to this method, the voltage generator is connected to the actuator when the mobile electrode structure is in the rest position. The electric charge provided to the actuator causes the mobile electrode structure to move in the direction of its complete displacement position. When the mobile structure reaches the complete displacement position, the voltage generator actuator is disconnected and, simultaneously, the shunt means are connected so as to discharge the actuator and cause the voltage between the fixed electrode structure and the mobile electrode structure to drop back to zero.

It was seen above that the actuator capacitance behaves like a strictly increasing function of the displacement of the mobile electrode structure from its rest position. This is why the graph of FIG. 4 uses the actuator capacitance $C_{comb}$ as abscissa instead of expressly using the position of the mobile electrode structure. It will be noted that the axes of the graph intersect at a point on the abscissa $C_p$, with $C_p$ being the actuator capacitance when the mobile electrode structure is occupying the rest position. The complete displacement position is indicated by the point on the abscissa that corresponds to capacitance $C_p C_{act\_m}$. It should also be specified that, in the example shown in FIG. 4, it is assumed that the capacitance ratio $C_p/C_{act\_m}$ is equal to 1, and also that the value of voltage $U_1$, supplied by the generator, is 25 volts.

The curve in a thin dotted line, which extends below the thick dotted line curve, is corresponds to the electrostatic energy stored in the actuator capacitor. It can be seen that, when the mobile electrode structure is in a rest position, the electrostatic energy stored in the actuator corresponds to the energy supplied by the voltage generator. In other words, in the rest position, all of the energy supplied is used to charge the parasitic capacitance. Conversely, when the mobile electrode structure is in the complete displacement position, the actuator capacitor value is double the parasitic capacitance value and the value of the stored electrostatic energy is also double. It will be noted, however, that the thick dotted line, which corresponds to the total energy supplied by the generator passes well above the thin dotted line. It will be clear that the hatched space between the thick dotted line and the thin dotted line represents the part of the energy supplied by the generator that has been converted into mechanical energy. The graph shows that, at the end of a cycle, in this example, exactly one third of the energy supplied is converted into mechanical energy. The other two thirds are lost when the voltage between the two electrode structures is returned to zero by the shunt means.

The thick continuous line corresponds to the energy supplied in accordance with one embodiment of the present invention. According to this embodiment, as previously, the voltage generator is connected to the actuator when the mobile electrode structure is in its rest position. However, according to the present invention, the actuator is disconnected from the voltage generator well before the mobile electrode structure has reached the complete displacement position. Once the actuator has been disconnected from the voltage generator, the actuator charge is kept constant until the mobile electrode structure has reached the complete displacement position. It is only once the complete displacement position has been reached that the voltage between the electrode structures is returned to zero by the shunt means. In the example shown, it was assumed that voltage $U_2$ supplied by the generator was 32 volts.

The graph of FIG. 4 shows that at the end of a cycle, with the values chosen for this example, the total energy supplied by the generator is practically the same with voltage $U_2$ as with voltage $U_1$. However, the shape of the two curves is very different. Indeed, the continuous line curve rapidly rises to reach a plateau when the voltage generator is disconnected, whereas the slope of the dotted line curve remains the same until the end of the cycle. The continuous line curve corresponds to the electrostatic energy accumulated in the actuator capacitance. As previously, it can be seen that when the mobile electrode structure is in the rest position, the electrostatic energy accumulated in the actuator corresponds to the energy supplied by the voltage generator. When the mobile electrode structure moves to position $C_{ref}$ where the generator is disconnected, the electrostatic energy stored in the actuator increases proportionally to the actuator capacitance. However, on the same path, the total energy supplied by the generator increases even more rapidly, and the hatched space between the continuous thick line and the continuous thin line corresponds to the part of the energy supplied by the generator that has been converted into mechanical energy.

As shown by the graph of FIG. 4, once the actuator and voltage generator have been disconnected, the electrostatic energy contained in the actuator gradually decreases. This decrease is the direct consequence of the fact that the charge is kept constant whereas the actuator capacitance increases regularly. It will be clear that the electrostatic energy thus lost by the actuator is converted into mechanical energy. The graph shows that, in this example, practically 45% of the energy supplied by the voltage generator is converted into mechanical energy. The other 55 percent is wasted when the voltage between the two electrode structures is returned to zero by the shunt means.

The FIG. 4 graph explains why the energy yield (i.e., energy efficiency) of an electrostatic motor according to the present invention is better than that of the electrostatic motors of the prior art. The Applicant has checked both with calculations and empirically that, from the point of view of yield, the optimum position of the mobile electrode structure to which the charge pump is disconnected is the position at which the actuator capacitance increase from the rest position is $C_{ref} = \sqrt{(C_p + C_{act\_m}) \cdot C_p} - C_p$. Of course, it will be clear that this position is only optimal if the charge pump voltage is sufficient to supply all the electrostatic energy necessary during the shortened charge pump connection time.

According to a particularly simple embodiment of the present invention, the electrostatic motor includes control means that are provided for connecting the charge pump cyclically to the actuator to supply the same pulse at each cycle. The predetermined pulse duration is based on an estimate of the time taken by the mobile electrode structure to move from the rest position to the optimum position. Moreover, the constant voltage supplied by the charge pump is determined such that each pulse can supply the electrostatic energy necessary for the actuator to complete one cycle at a sufficient speed. It should be specified that the voltage is preferably determined with a certain margin, such that a small additional quantity of energy is available to deal with any fluctuations in the resistant torque that resists the working of the motor.

As has been seen, in this example, the electrostatic motor of the invention is for driving the display members of an analogue watch. One feature of this application is that the electrostatic motor stresses are capable of fluctuating considerably depending upon the conditions of wear of the watch. Moreover, generally, one can expect the efficiency of the mechanical system that connects the actuator to the display members to deteriorate gradually as the watch ages. In order to prevent such variations from compromising the proper working of the watch, an advantageous embodiment of the invention provides for the voltage and duration of the pulses supplied by the charge pump to be determined using at least one regulating loop. This regulating loop comprises means for measuring the displacement of the mobile electrode structure. In this example, these displacement measuring means are even twofold. In fact, the motor includes position measuring means, which are for measuring the actuator capacitance or, in other words, the position of the mobile electrode at a given moment, and also means for measuring the current supplied by the charge pump, which are used as means for measuring the instantaneous speed of the mobile electrode structure.

In this example, the position measuring means comprise a capacitor with a known capacitance $C_A$, which is series-connected with capacitance $C_{Comb}$ formed by the two electrode structures, and also means for evaluating voltage $U_A$ between the two terminals of the capacitor with capacitance $C_A$. Capacitor $C_{Comb}$ of the electrode structures is linked at a given moment to the ratio between the determined voltage $U_D$ supplied by the charge pump and voltage $U_A$ at the capacitor terminals by the following relationship:

$$\frac{1}{C_{Comb}} = \frac{1}{C_A} \cdot \left(\frac{U_D}{U_A} - 1\right)$$

If capacitance $C_A$ is chosen to be sufficiently large relative to capacitance $C_{Comb}$ of the electrode structures, the voltage between the two electrode structures is practically equal to voltage $U_D$ supplied by the charge pump. In such conditions:

$$C_{Comb} \approx C_A \cdot \frac{U_A}{U_D}$$

Alternatively, the position measuring means could comprise three capacitors and conform to those described in EP Patent No. 1,793,208.

As regards the speed measuring means, in this example, these include a current detector connected between the charge pump and one of the two electrode structures of the actuator, so as to measure the speed of growth of the actuator charge. Since the actuator charge is proportional to the capacitance, the current intensity is proportional to the capacitance growth speed, or more precisely:

$$i(t) = U_D \cdot \frac{dC_{Comb}(t)}{dt}$$

In the embodiment that forms the subject of this example, the determined voltage $U_D$ supplied by the charge pump can be switched between four different values, for example 28, 40, 55 and 80 volts. Owing to this feature, it is possible to switch the voltage supplied by the charge pump to a higher value when the position measuring means indicate that the actuator does not have enough energy to complete a cycle. By way of example, the position measuring means could check that, at the end of its displacement cycle, the mobile electrode structure has actually reached the complete displacement position. This check could be performed for example by checking that the actuator capacitance $C_{Comb}$ has actually reached the value $C_P + C_{act\_m}$ just before the electrode structures are discharged by the shunt means connected between the structures.

As has been seen, in this example, the displacement measuring means include not only position measuring means, but also means for measuring the speed of the mobile electrode structure. Thus, according to this example, the displacement measuring means are also for checking, in real time, that the energy supplied to the actuator is sufficient for it to drive the motor at sufficient speed. Thus, in this example, the speed measuring means are arranged for measuring the speed of the mobile electrode structure during the phase during which the charge pump is connected to the actuator. When the current measured by the speed measuring means corresponds to a lower speed than a first threshold value, the regulating means extend the time that the charge pump is connected to the actuator, beyond the time normally necessary for the mobile electrode structure to reach the optimum position.

Moreover, the speed measuring means are also provided for reducing the amount of energy supplied to the actuator when this amount is unnecessarily high, given the torque to be supplied by the electrostatic motor at output. Thus, when the current measured by the speed measuring means corresponds to a higher speed than a second threshold value, the regulating means react by switching the voltage supplied by the charge pump to a lower value.

Those skilled in the art will understand that there is absolutely no need for the displacement measuring means to be twofold. Indeed, according to a first variant, these means could be limited to position measuring means, while in a second variant, they could, conversely, be limited to speed measuring means. It will also be clear that various alterations and/or improvements obvious to those skilled in the art could be made to the various embodiments of the invention described in this description without departing from the scope of the invention defined by the annexed claims.

Thus, in accordance with the present invention, an electrostatic motor has been described that includes an electrostatic actuator (10) and a pulse generator (7, 8) for actuating the actuator with sufficient energy to drive the motor. The pulse generator is adapted to determine a pulse voltage level ($U_D$) and a shortened pulse duration that is a function of the determined voltage level ($U_D$) and the electric energy necessary for driving the motor and a function of parasitic capacitances ($C_P$) and the maximum capacitance ($C_{act\_m}$) of the actuator in order to reduce electrostatic losses in the actuator.

What is claimed is:

1. An electrostatic motor includes:
   (a) an actuator comprising a fixed electrode structure and a mobile electrode structure, wherein the mobile electrode structure is arranged to move cyclically from a first rest position to a second complete displacement position under the effect of an electrostatic force exerted between the fixed electrode structure and the mobile electrode structure, and then returned to the rest position in an absence of the electrostatic force;
   (b) shunt means connected between the fixed electrode structure and the mobile electrode structure for cyclically discharging the fixed electrode structure and the mobile electrode structure so as to remove the electrostatic force once the mobile electrode structure has reached the complete displacement position; and
   (c) a generator connected between the fixed electrode structure and the mobile electrode structure for cyclically charging the fixed electrode structure and the mobile electrode structure by starting to charge when the mobile electrode structure is in the rest position, and wherein the fixed electrode structure and the mobile electrode structure have an electrostatic capacitance that varies as a strictly increasing function of a path travelled by the mobile electrode structure from the rest position in the direction of the complete displacement position, wherein the generator is a voltage generator for generating a determined potential difference, and wherein the generator stops charging the fixed electrode structure and the mobile electrode structure as soon as the generator has supplied the actuator with electrostatic energy necessary to complete a cycle while driving the motor at a desired speed, and wherein the generator stops charging before the mobile electrode structure has reached the complete displacement position.

2. The electrostatic motor according to claim 1, wherein the actuator is an interdigited comb actuator.

3. A watch including an electrostatic motor according to claim 2.

4. A watch including an electrostatic motor according to claim 1.

5. An electrostatic motor includes:
   (a) an actuator comprising a fixed electrode structure and a mobile electrode structure, wherein the mobile electrode structure is arranged to move cyclically from a first rest position to a second complete displacement position under the effect of an electrostatic force exerted between the fixed electrode structure and the mobile electrode structure, and then returned to the rest position in an absence of the electrostatic force;
   (b) shunt means connected between the fixed electrode structure and the mobile electrode structure for cyclically discharging the fixed electrode structure and the mobile electrode structure so as to remove the electrostatic force once the mobile electrode structure has reached the complete displacement position;
   (c) a generator connected between the fixed electrode structure and the mobile electrode structure for cyclically charging the fixed electrode structure and the mobile electrode structure by starting to charge when the mobile electrode structure is in the rest position, and wherein the fixed electrode structure and the mobile electrode structure have an electrostatic capacitance that varies as a strictly increasing function of a path travelled by the mobile electrode structure from the rest position in the direction of the complete displacement position, wherein the generator is a voltage generator for generating a determined potential difference, and wherein the generator stops charging the fixed electrode structure and the mobile electrode structure as soon as the generator has supplied the actuator with electrostatic energy necessary to complete a cycle while driving the motor at a desired speed, and wherein the generator stops charging before the mobile electrode structure has reached the complete displacement position; and
   (d) regulating means for controlling powering of the actuator, wherein the regulating means makes the generator stop charging the fixed electrode structure and the mobile electrode structure when the mobile electrode structure is approximately located in an optimum position for which the electrostatic capacitance of the fixed electrode structure and the mobile electrode structure is equal to $C_{rel}=\sqrt{(C_p+C_{act\_m})\cdot C_p}-C_p$.

6. The electrostatic motor according to claim 5, wherein the electrostatic motor further includes:
   (e) displacement measuring means for measuring the displacement of the mobile electrode structure, wherein the voltage generator is switchable selectively between a plurality of predetermined output voltages, and wherein the regulating means is provided for controlling the voltage generator so that a higher output voltage is selected when the mobile electrode structure has not reached the complete displacement position at the end of a cycle.

7. The electrostatic motor according to claim 6, wherein the displacement measuring means for said mobile electrode structure measures the speed of the mobile electrode structure, wherein the regulating means makes the voltage generator extend, beyond said optimum position, a charging phase during which the fixed electrode structure and the mobile electrode structure are charged, when the measured speed of the mobile electrode structure is too slow, so as to prevent the time necessary to reach the complete displacement position from being too long.

8. The electrostatic motor according to claim 7, wherein the actuator is an interdigited comb actuator.

9. A watch including an electrostatic motor according to claim 7.

10. The electrostatic motor according to claim 6, wherein the displacement measuring means for said mobile electrode structure measures the position of the mobile electrode structure, wherein the regulating means makes the voltage generator extend, beyond said optimum position, a charging phase during which the electrode structures are charged, when the distance between the rest position and the measured position of the mobile electrode structure is less than a threshold value, so as to prevent the time necessary to reach the complete displacement position from being too long.

11. The electrostatic motor according to claim 10, wherein the actuator is an interdigited comb actuator.

12. A watch including an electrostatic motor according to claim 10.

13. The electrostatic motor according to claim 6, wherein the voltage generator is a charge pump that is disconnected by the regulating means to interrupt a charging phase of the actuator.

14. The electrostatic motor according to claim 13, wherein the actuator is an interdigited comb actuator.

15. A watch including an electrostatic motor according to claim 13.

16. The electrostatic motor according to claim 6, wherein the voltage supplied by the voltage generator is switchable between at least four voltage levels.

17. The electrostatic motor according to claim 16, wherein the actuator is an interdigited comb actuator.

18. A watch including an electrostatic motor according to claim 16.

19. The electrostatic motor according to claim 6, wherein the actuator is an interdigited comb actuator.

20. A watch including an electrostatic motor according to claim 6.

21. The electrostatic motor according to claim 5, wherein the actuator is an interdigited comb actuator.

22. A watch including an electrostatic motor according to claim 5.

* * * * *